United States Patent
Prest et al.

(10) Patent No.: US 9,033,024 B2
(45) Date of Patent: May 19, 2015

(54) INSERT MOLDING OF BULK AMORPHOUS ALLOY INTO OPEN CELL FOAM

(75) Inventors: Christopher D. Prest, San Francisco, CA (US); Matthew S. Scott, Campbell, CA (US); Stephen P. Zadesky, Portola Valley, CA (US); Dermot J. Stratton, San Francisco, CA (US); Joseph C. Poole, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 398 days.

(21) Appl. No.: 13/541,550

(22) Filed: Jul. 3, 2012

(65) Prior Publication Data

US 2014/0007983 A1 Jan. 9, 2014

(51) Int. Cl.
*B22D 19/00* (2006.01)
*B22D 19/16* (2006.01)

(52) U.S. Cl.
CPC .............. *B22D 19/00* (2013.01); *B22D 19/16* (2013.01)

(58) Field of Classification Search
CPC ..... B22D 19/00; B22D 19/0081; B22D 19/16
USPC .............................. 164/91, 98–100, 108, 111
See application file for complete search history.

(56) References Cited

U.S. PATENT DOCUMENTS

| | | |
|---|---|---|
| 3,694,325 A | 9/1972 | Katz |
| 5,288,344 A | 2/1994 | Peker |
| 5,302,414 A | 4/1994 | Alkhimov |
| 5,368,659 A | 11/1994 | Peker |
| 5,588,477 A | 12/1996 | Sokol |
| 5,618,359 A | 4/1997 | Lin |
| 5,679,041 A | 10/1997 | Sokol |
| 5,735,975 A | 4/1998 | Lin |
| 5,738,907 A | 4/1998 | Vaccaro |
| 5,951,791 A | 9/1999 | Bell |
| 5,992,500 A * | 11/1999 | Schneider et al. .............. 164/98 |
| 6,325,868 B1 | 12/2001 | Kim |
| 6,408,928 B1 | 6/2002 | Heinrich |
| 6,464,933 B1 | 10/2002 | Popoola |
| 6,678,182 B2 | 1/2004 | Joseph |
| 6,874,562 B2 * | 4/2005 | Knott et al. ..................... 164/79 |
| 7,328,831 B1 | 2/2008 | Topolski |
| 7,575,040 B2 | 8/2009 | Johnson |
| 8,151,860 B2 * | 4/2012 | Mortensen et al. ............. 164/15 |
| 2007/0079907 A1 | 4/2007 | Johnson |
| 2008/0118387 A1 | 5/2008 | Demetriou |

(Continued)

FOREIGN PATENT DOCUMENTS

JP    2001-303218    10/2001

OTHER PUBLICATIONS

Inoue et al., "Bulk amorphous alloys with high mechanical strength and good soft magnetic properties in Fe—Tm—B (TM=IV-VIII group transition metal) system", Appl. Phys. Lett., vol. 71, p. 464 (1997).

Shen et., "Bulk Glassy CO43FE20TA5.5B31.5 Alloy with High Glass-Forming Ability and Good Soft Magnetic Properties", Materials Transactions, vol. 42 No. 10 (2001) pp. 2136-2139.

(Continued)

*Primary Examiner* — Kevin E Yoon
(74) *Attorney, Agent, or Firm* — Brownstein Hyatt Farber Schreck, LLP (57) ABSTRACT

Provided in one embodiment is a method of making use of foams as a processing aid or to improve the properties of bulk-solidifying amorphous alloy materials. Other embodiments include the bulk-solidifying amorphous alloy/foam composite materials made in accordance with the methods.

17 Claims, 5 Drawing Sheets

(56) References Cited

U.S. PATENT DOCUMENTS

| | | |
|---|---|---|
| 2008/0135136 A1 | 6/2008 | Demetriou |
| 2009/0017263 A1* | 1/2009 | Yeates ............... 428/167 |
| 2009/0162629 A1 | 6/2009 | Demetriou |
| 2009/0214373 A1* | 8/2009 | Stinson et al. ............ 419/8 |
| 2010/0084052 A1 | 4/2010 | Farmer |
| 2010/0230012 A1 | 9/2010 | Demetriou |
| 2010/0300148 A1 | 12/2010 | Demetriou |

OTHER PUBLICATIONS

Wolf, S.; R.N. Tauber (1986),Silicon Processing for the VLSI Era: vol. 1—Process Technology. Lattice Press. pp. 531-534, 546.

Walker, Perrin; William H. Tarn (1991), CRC Handbook of Metal Etchants. pp. 287-291.

Kohler, Michael (1999). Etching in Microsystem Technology. John Wiley & Son Ltd. p. 329.

\* cited by examiner

INSERT MOLDING OF BULK AMORPHOUS ALLOY INTO OPEN CELL FOAM

FIELD OF INVENTION

This invention relates to methods of making use of open cell foams as a processing aid or to improve the properties of bulk-solidifying amorphous alloy materials, and to the materials made therefrom.

BACKGROUND

Bulk-solidifying amorphous alloys have been made in a variety of metal systems. They are generally prepared by quenching from above the melting temperature to the ambient temperature. Generally, high cooling rates on the order of $10^{5\circ}$ C./sec, are needed to achieve an amorphous structure. The lowest rate by which a bulk solidifying alloy can be cooled to avoid crystallization, thereby achieving and maintaining the amorphous structure during cooling, is referred to as the "critical cooling rate" for the alloy. In order to achieve a cooling rate higher than the critical cooling rate, heat has to be extracted from the sample. Thus, the thickness of articles made from amorphous alloys often becomes a limiting dimension, which is generally referred to as the "critical (casting) thickness." A critical casting thickness can be obtained by heat-flow calculations, taking into account the critical cooling rate.

Until the early nineties, the processability of amorphous alloys was quite limited, and amorphous alloys were readily available only in powder form or in very thin foils or strips with a critical casting thickness of less than 100 micrometers. A new class of amorphous alloys based mostly on Zr and Ti alloy systems was developed in the nineties, and since then more amorphous alloy systems based on different elements have been developed. These families of alloys have much lower critical cooling rates of less than $10^{3\circ}$ C./sec, and thus these articles have much larger critical casting thicknesses than their previous counterparts. The bulk-solidifying amorphous alloys are capable of being shaped into a variety of forms, thereby providing a unique advantage in preparing intricately designed parts.

One feature of the bulk-solidifying amorphous alloy that has somewhat limited its use is that it has a relatively small critical casting thickness. That is, the overall thickness of bulk-solidifying amorphous material that can be cast is relatively small, thus limiting its use for thicker casting parts. In addition, bulk-solidifying amorphous material, while extremely hard and capable of being more elastically deformed than other hard metals, also are brittle. Accordingly, thin layers of bulk-solidifying amorphous alloy materials may be susceptible to cracks or other deformities when subjected to stress.

Foams and other highly porous materials with a cellular structure are known to have many interesting combinations of physical and mechanical properties, such as high stiffness in conjunction with very low specific weight or high gas permeability combined with high thermal conductivity. Among man-made cellular materials, polymeric foams are currently the most important ones with widespread applications in nearly every sector of technology. Metals and alloys may also be produced as cellular materials or foams.

There are many ways to manufacture cellular metallic materials. Some methods are similar to techniques used for foaming aqueous or polymer liquids, whereas others are specially designed by taking advantage of characteristic properties of metals such as their sintering activity or the fact that they can be electrically deposited. The various methods can be classified according to the state in which the metal is processed. The four "families" of processes are as follows: (i) from liquid metal, (ii) from solid metal in powdered form, (iii) from metal vapor or gaseous metallic compounds, and (iv) from a metal ion solution.

Powder metallurgy is a method of forming conventional closed cell foams where the starting materials are metal powders and where the actual foaming takes place in the liquid state. The production process begins with the mixing of metal powders, which can be made up of elementary metal powders, alloy powders or metal powder blends in the presence of a blowing or foaming agent. Afterwards the mix is compacted to yield a dense, semi-finished product. In principle, the compaction can be done by any technique that ensures that the blowing agent is embedded into the metal matrix without any notable residual open porosity. Examples of such compaction methods are hot uniaxial or isostatic compression, rod extrusion or powder rolling. Which compaction method is chosen depends on the required shape of the precursor material. Rectangular profiles with various cross-sections may be made, from which thin sheets can then be formed by rolling. The manufacture of the precursor has to be carried out carefully because any residual porosity or other defects may lead to poor results in further processing.

Heat treatment at temperatures near the melting point of the matrix material is the next step in the powder metallurgy process. The blowing or foaming agent, which is homogeneously distributed within the dense metallic matrix, decomposes at these temperatures. The released gas forces the compacted precursor material to expand, thus forming its highly porous structure.

The method is not restricted to aluminum and its alloys. Tin, zinc, brass, lead, gold and some other metals and alloys can also be foamed by choosing appropriate blowing agents and process parameters. The most common alloys for foaming are pure aluminum or wrought alloys. Casting alloys such as $AlSi_7Mg$ (A356) and $AlSi_{12}$ are also frequently used because of their low melting point and good foaming properties.

U.S. Pat. No. 5,302,414 to Alkhimov et al., herein incorporated by reference in its entirety, discloses a cold gas-dynamic spraying method for applying a coating to an article by introducing into a gas, particles of a powder of a metal, alloy, polymer or mechanical mixture of a metal and an alloy. The gas and particles are formed into a supersonic jet having a temperature considerably below a fusing temperature of the powder material and a velocity of from about 300 to about 1,200 m/sec. The jet is then directed against an article of a metal, alloy or dielectric, thereby coating the article with the particles.

U.S. Pat. No. 6,408,928 to Heinrich et al., herein incorporated by reference in its entirety, discloses an apparatus for producing expandable metal, comprising (1) means for feeding a powder mixture containing at least one metal powder and at least one blowing agent in powder form; (2) means for producing a compact body from the powder mixture; and (3) means for heating the compact body to a temperature equal to or above the breakdown temperature of the blowing agent. The cold-gas spray apparatus can be used to form metal foams obtained from the foamable metal bodies.

U.S. Pat. No. 6,464,933 to Popoola et al., herein incorporated by reference in its entirety, discloses a method of fabricating a foamed metal structure using a supply of metal particles. The method comprises the steps of (a) introducing a supply of powder metal particles and foaming agent particles into a propellant gas to form a gas/particle mixture; (b) projecting the mixture at or above a critical velocity of at least sonic velocity onto a metallic substrate to create a deposit of pressure-compacted metal particles containing the admixed foaming agent; and (c) subjecting at least the coating on said substrate to a thermal excursion effective to activate expansion of the foaming agent while softening the metal particles for plastic deformation under the influence of the expanding gases.

A process for manufacturing a foamed article is described in WO 01/62416 A1, according to which an ingot mold is filled with foam by collecting individual bubbles rising in the melt. However, this process, in which the gas bubbles are introduced and isolated for the most part by way of a so-called rotor impeller, has the disadvantages that, on the one hand, filling the ingot mold is slow and, therefore, with a cooled ingot mold wall, the part of the article that was formed last has a frequently disadvantageously thick wall layer, and, on the other hand, the bubble size is embodied variably in an uncontrolled manner. As a result, the mechanical characteristic values of a part or article created in this manner often feature a great dispersion that is unfavorable for the most part.

It would be desirable to provide a method for processing bulk-solidifying amorphous alloy materials together with metal foams to provide new materials having improved properties and processability.

SUMMARY

A proposed solution according to embodiments herein is to provide a method of forming an article that includes a foam having insert molded thereon and/or therein a bulk-solidifying amorphous alloy. In accordance with one embodiment, there is provided a method of making an article that includes providing a foam material, and insert casting onto the foam material a bulk-solidifying amorphous alloy to form the article.

In accordance with another embodiment, there is provided a method of making an article that includes providing a foam material, insert casting onto the foam material a bulk-solidifying amorphous alloy, removing the foam, and optionally inserting another metal or bulk-solidifying amorphous alloy to replace the removed foam.

In accordance with another embodiment, there is provided an article comprised of a bulk-solidifying amorphous alloy and a foam. In one embodiment, the article includes of a laminate of bulk-solidifying amorphous alloy and a foam. In another embodiment, the article includes a bulk-solidifying amorphous alloy having a thickness greater than the critical casting thickness, optionally including a foam, or having dispersed therein a metal or a bulk-solidifying amorphous alloy.

DETAILED DESCRIPTION

All publications, patents, and patent applications cited in this Specification are hereby incorporated by reference in their entirety.

The articles "a" and "an" are used herein to refer to one or to more than one (i.e., to at least one) of the grammatical object of the article. By way of example, "a polymer resin" means one polymer resin or more than one polymer resin. Any ranges cited herein are inclusive. The terms "substantially" and "about" used throughout this Specification are used to describe and account for small fluctuations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Bulk-solidifying amorphous alloys, or bulk metallic glasses ("BMG"), are a recently developed class of metallic materials. These alloys may be solidified and cooled at relatively slow rates, and they retain the amorphous, non-crystalline (i.e., glassy) state at room temperature. Amorphous alloys have many superior properties than their crystalline counterparts. However, if the cooling rate is not sufficiently high, crystals may form inside the alloy during cooling, so that the benefits of the amorphous state can be lost. For example, one challenge with the fabrication of bulk amorphous alloy parts is partial crystallization of the parts due to either slow cooling or impurities in the raw alloy material. As a high degree of amorphicity (and, conversely, a low degree of crystallinity) is desirable in BMG parts, there is a need to develop methods for casting BMG parts having controlled amount of amorphicity.

Figure 1:
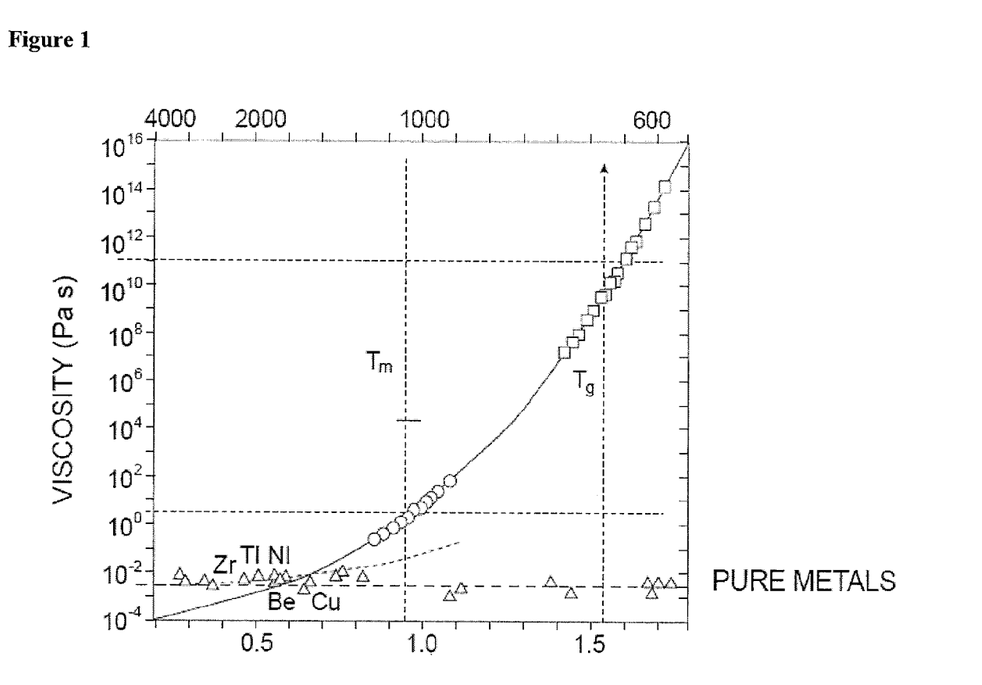
FIG. 1 provides a temperature-viscosity diagram of an exemplary bulk solidifying amorphous alloy.

FIG. 1 (obtained from U.S. Pat. No. 7,575,040) shows a viscosity-temperature graph of an exemplary bulk solidifying amorphous alloy, from the VIT-001 series of Zr—Ti—Ni—Cu—Be family manufactured by Liquid metal Technology. It should be noted that there is no clear liquid/solid transformation for a bulk solidifying amorphous metal during the formation of an amorphous solid. The molten alloy becomes more and more viscous with increasing undercooling until it approaches solid form around the glass transition temperature. Accordingly, the temperature of solidification front for bulk solidifying amorphous alloys can be around glass transition temperature, where the alloy will practically act as a solid for the purposes of pulling out the quenched amorphous sheet product.

Figure 2:
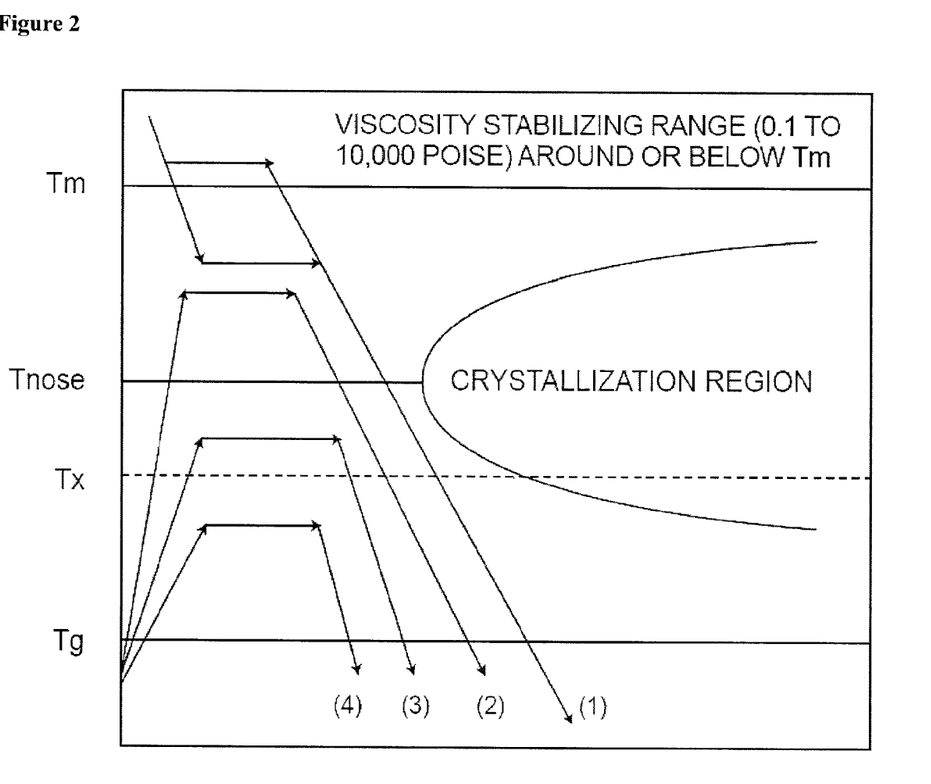
FIG. 2 provides a schematic of a time-temperature-transformation (TTT) diagram for an exemplary bulk solidifying amorphous alloy.

FIG. 2 (obtained from U.S. Pat. No. 7,575,040) shows the time-temperature-transformation (TTT) cooling curve of an exemplary bulk solidifying amorphous alloy, or TTT diagram. Bulk-solidifying amorphous metals do not experience a liquid/solid crystallization transformation upon cooling, as with conventional metals. Instead, the highly fluid, non crystalline form of the metal found at high temperatures (near a "melting temperature" Tm) becomes more viscous as the temperature is reduced (near to the glass transition temperature Tg), eventually taking on the outward physical properties of a conventional solid.

Even though there is no liquid/crystallization transformation for a bulk solidifying amorphous metal, a "melting temperature" Tm may be defined as the thermodynamic liquidus temperature of the corresponding crystalline phase. Under this regime, the viscosity of bulk-solidifying amorphous alloys at the melting temperature could lie in the range of about 0.1 poise to about 10,000 poise, and even sometimes under 0.01 poise. A lower viscosity at the "melting temperature" would provide faster and complete filling of intricate portions of the shell/mold with a bulk solidifying amorphous metal for forming the BMG parts. Furthermore, the cooling rate of the molten metal to form a BMG part has to such that the time-temperature profile during cooling does not traverse through the nose-shaped region bounding the crystallized region in the TTT diagram of FIG. 2. In FIG. 2, Tnose is the critical crystallization temperature Tx where crystallization is most rapid and occurs in the shortest time scale.

The supercooled liquid region, the temperature region between Tg and Tx is a manifestation of the extraordinary stability against crystallization of bulk solidification alloys. In this temperature region the bulk solidifying alloy can exist as a high viscous liquid. The viscosity of the bulk solidifying alloy in the supercooled liquid region can vary between $10^{12}$ Pa s at the glass transition temperature down to $10^5$ Pa s at the crystallization temperature, the high temperature limit of the supercooled liquid region. Liquids with such viscosities can undergo substantial plastic strain under an applied pressure. The embodiments herein make use of the large plastic formability in the supercooled liquid region as a forming and separating method.

One needs to clarify something about Tx. Technically, the nose-shaped curve shown in the TTT diagram describes Tx as a function of temperature and time. Thus, regardless of the trajectory that one takes while heating or cooling a metal alloy, when one hits the TTT curve, one has reached Tx. In FIG. 2, Tx is shown as a dashed line as Tx can vary from close to Tm to close to Tg.

The schematic TTT diagram of FIG. 2 shows processing methods of die casting from at or above Tm to below Tg without the time-temperature trajectory (shown as (1) as an example trajectory) hitting the TTT curve. During die casting, the forming takes place substantially simultaneously with fast cooling to avoid the trajectory hitting the TTT curve. The processing methods for superplastic forming (SPF) from at or below Tg to below Tm without the time-temperature trajectory (shown as (2), (3) and (4) as example trajectories) hitting the TTT curve. In SPF, the amorphous BMG is reheated into the supercooled liquid region where the available processing window could be much larger than die casting, resulting in better controllability of the process. The SPF process does not require fast cooling to avoid crystallization during cooling. Also, as shown by example trajectories (2), (3) and (4), the SPF can be carried out with the highest temperature during SPF being above Tnose or below Tnose, up to about Tm. If one heats up a piece of amorphous alloy but manages to avoid hitting the TTT curve, you have heated "between Tg and Tm", but one would have not reached Tx.

Typical differential scanning calorimeter (DSC) heating curves of bulk-solidifying amorphous alloys taken at a heating rate of 20 C/min describe, for the most part, a particular trajectory across the TTT data where one would likely see a Tg at a certain temperature, a Tx when the DSC heating ramp crosses the TTT crystallization onset, and eventually melting peaks when the same trajectory crosses the temperature range for melting. If one heats a bulk-solidifying amorphous alloy at a rapid heating rate as shown by the ramp up portion of trajectories (2), (3) and (4) in FIG. 2, then one could avoid the TTT curve entirely, and the DSC data would show a glass transition but no Tx upon heating. Another way to think about it is trajectories (2), (3) and (4) can fall anywhere in temperature between the nose of the TTT curve (and even above it) and the Tg line, as long as it does not hit the crystallization curve. That just means that the horizontal plateau in trajectories might get much shorter as one increases the processing temperature.

Phase

The term "phase" herein can refer to one that can be found in a thermodynamic phase diagram. A phase is a region of space (e.g., a thermodynamic system) throughout which all physical properties of a material are essentially uniform. Examples of physical properties include density, index of refraction, chemical composition and lattice periodicity. A simple description of a phase is a region of material that is chemically uniform, physically distinct, and/or mechanically separable. For example, in a system consisting of ice and water in a glass jar, the ice cubes are one phase, the water is a second phase, and the humid air over the water is a third phase. The glass of the jar is another separate phase. A phase can refer to a solid solution, which can be a binary, tertiary, quaternary, or more, solution, or a compound, such as an intermetallic compound. As another example, an amorphous phase is distinct from a crystalline phase.

Metal, Transition Metal, and Non-metal

The term "metal" refers to an electropositive chemical element. The term "element" in this Specification refers generally to an element that can be found in a Periodic Table. Physically, a metal atom in the ground state contains a partially filled band with an empty state close to an occupied state. The term "transition metal" is any of the metallic elements within Groups 3 to 12 in the Periodic Table that have an incomplete inner electron shell and that serve as transitional links between the most and the least electropositive in a series of elements. Transition metals are characterized by multiple valences, colored compounds, and the ability to form stable complex ions. The term "nonmetal" refers to a chemical element that does not have the capacity to lose electrons and form a positive ion.

Depending on the application, any suitable nonmetal elements, or their combinations, can be used. The alloy (or "alloy composition") can comprise multiple nonmetal elements, such as at least two, at least three, at least four, or more, nonmetal elements. A nonmetal element can be any element that is found in Groups 13-17 in the Periodic Table. For example, a nonmetal element can be any one of F, Cl, Br, I, At, O, S, Se, Te, Po, N, P, As, Sb, Bi, C, Si, Ge, Sn, Pb, and B. Occasionally, a nonmetal element can also refer to certain metalloids (e.g., B, Si, Ge, As, Sb, Te, and Po) in Groups 13-17. In one embodiment, the nonmetal elements can include B, Si, C, P, or combinations thereof. Accordingly, for example, the alloy can comprise a boride, a carbide, or both.

A transition metal element can be any of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, dubnium, seaborgium, bohrium, hassium, meitnerium, ununnilium, unununium, and ununbium. In one embodiment, a BMG containing a transition metal element can have at least one of Sc, Y, La, Ac, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, and Hg. Depending on the application, any suitable transitional metal elements, or their combinations, can be used. The alloy composition can comprise multiple transitional metal elements, such as at least two, at least three, at least four, or more, transitional metal elements.

The presently described alloy or alloy "sample" or "specimen" alloy can have any shape or size. For example, the alloy can have a shape of a particulate, which can have a shape such as spherical, ellipsoid, wire-like, rod-like, sheet-like, flake-like, or an irregular shape. The particulate can have any size. For example, it can have an average diameter of between about 1 micron and about 100 microns, such as between about 5 microns and about 80 microns, such as between about 10 microns and about 60 microns, such as between about 15 microns and about 50 microns, such as between about 15 microns and about 45 microns, such as between about 20 microns and about 40 microns, such as between about 25 microns and about 35 microns. For example, in one embodiment, the average diameter of the particulate is between about 25 microns and about 44 microns. In some embodiments, smaller particulates, such as those in the nanometer range, or larger particulates, such as those bigger than 100 microns, can be used.

The alloy sample or specimen can also be of a much larger dimension. For example, it can be a bulk structural component, such as an ingot, housing/casing of an electronic device or even a portion of a structural component that has dimensions in the millimeter, centimeter, or meter range.

Solid Solution

The term "solid solution" refers to a solid form of a solution. The term "solution" refers to a mixture of two or more substances, which may be solids, liquids, gases, or a combination of these. The mixture can be homogeneous or heterogeneous. The term "mixture" is a composition of two or more substances that are combined with each other and are generally capable of being separated. Generally, the two or more substances are not chemically combined with each other.

Alloy

In some embodiments, the alloy composition described herein can be fully alloyed. In one embodiment, an "alloy" refers to a homogeneous mixture or solid solution of two or more metals, the atoms of one replacing or occupying interstitial positions between the atoms of the other; for example, brass is an alloy of zinc and copper. An alloy, in contrast to a composite, can refer to a partial or complete solid solution of one or more elements in a metal matrix, such as one or more compounds in a metallic matrix. The term alloy herein can refer to both a complete solid solution alloy that can give single solid phase microstructure and a partial solution that can give two or more phases. An alloy composition described herein can refer to one comprising an alloy or one comprising an alloy-containing composite.

Thus, a fully alloyed alloy can have a homogenous distribution of the constituents, be it a solid solution phase, a compound phase, or both. The term "fully alloyed" used herein can account for minor variations within the error tolerance. For example, it can refer to at least 90% alloyed, such as at least 95% alloyed, such as at least 99% alloyed, such as at least 99.5% alloyed, such as at least 99.9% alloyed. The percentage herein can refer to either volume percent or weight percentage, depending on the context. These percentages can be balanced by impurities, which can be in terms of composition or phases that are not a part of the alloy.

Amorphous or Non-Crystalline Solid

An "amorphous" or "non-crystalline solid" is a solid that lacks lattice periodicity, which is characteristic of a crystal. As used herein, an "amorphous solid" includes "glass" which is an amorphous solid that softens and transforms into a liquid-like state upon heating through the glass transition. Generally, amorphous materials lack the long-range order characteristic of a crystal, though they can possess some short-range order at the atomic length scale due to the nature of chemical bonding. The distinction between amorphous solids and crystalline solids can be made based on lattice periodicity as determined by structural characterization techniques such as x-ray diffraction and transmission electron microscopy.

The terms "order" and "disorder" designate the presence or absence of some symmetry or correlation in a many-particle system. The terms "long-range order" and "short-range order" distinguish order in materials based on length scales.

The strictest form of order in a solid is lattice periodicity: a certain pattern (the arrangement of atoms in a unit cell) is repeated again and again to form a translationally invariant tiling of space. This is the defining property of a crystal. Possible symmetries have been classified in 14 Bravais lattices and 230 space groups.

Lattice periodicity implies long-range order. If only one unit cell is known, then by virtue of the translational symmetry it is possible to accurately predict all atomic positions at arbitrary distances. The converse is generally true, except, for example, in quasi-crystals that have perfectly deterministic tilings but do not possess lattice periodicity.

Long-range order characterizes physical systems in which remote portions of the same sample exhibit correlated behavior. This can be expressed as a correlation function, namely the spin-spin correlation function:

$$G(x,x') = \langle s(x), s(x') \rangle.$$

In the above function, s is the spin quantum number and x is the distance function within the particular system. This function is equal to unity when $x=x'$ and decreases as the distance $|x-x'|$ increases. Typically, it decays exponentially to zero at large distances, and the system is considered to be disordered. If, however, the correlation function decays to a constant value at large $|x-x'|$, then the system can be said to possess long-range order. If it decays to zero as a power of the distance, then it can be called quasi-long-range order. Note that what constitutes a large value of $|x-x'|$ is relative.

A system can be said to present quenched disorder when some parameters defining its behavior are random variables that do not evolve with time (i.e., they are quenched or frozen)—e.g., spin glasses. It is opposite to annealed disorder, where the random variables are allowed to evolve themselves. Embodiments herein include systems comprising quenched disorder.

The alloy described herein can be crystalline, partially crystalline, amorphous, or substantially amorphous. For example, the alloy sample/specimen can include at least some crystallinity, with grains/crystals having sizes in the nanometer and/or micrometer ranges. Alternatively, the alloy can be substantially amorphous, such as fully amorphous. In one embodiment, the alloy composition is at least substantially not amorphous, such as being substantially crystalline, such as being entirely crystalline.

In one embodiment, the presence of a crystal or a plurality of crystals in an otherwise amorphous alloy can be construed as a "crystalline phase" therein. The degree of crystallinity (or "crystallinity" for short in some embodiments) of an alloy can refer to the amount of the crystalline phase present in the alloy. The degree can refer to, for example, a fraction of crystals present in the alloy. The fraction can refer to volume fraction or weight fraction, depending on the context. A measure of how "amorphous" an amorphous alloy is can be amorphicity. Amorphicity can be measured in terms of a degree of crystallinity For example, in one embodiment, an alloy having a low degree of crystallinity can be said to have a high degree of amorphicity. In one embodiment, for example, an alloy having 60 vol % crystalline phase can have a 40 vol % amorphous phase.

Amorphous Alloy or Amorphous Metal

An "amorphous alloy" is an alloy having an amorphous content of more than 50% by volume, preferably more than 90% by volume of amorphous content, more preferably more than 95% by volume of amorphous content, and most preferably more than 99% to almost 100% by volume of amorphous content. Note that, as described above, an alloy high in amorphicity is equivalently low in degree of crystallinity. An "amorphous metal" is an amorphous metal material with a disordered atomic-scale structure. In contrast to most metals, which are crystalline and therefore have a highly ordered arrangement of atoms, amorphous alloys are non-crystalline. Materials in which such a disordered structure is produced directly from the liquid state during cooling are sometimes referred to as "glasses." Accordingly, amorphous metals are commonly referred to as "metallic glasses" or "glassy metals." In one embodiment, a bulk metallic glass ("BMG") can refer to an alloy, of which the microstructure is at least partially amorphous. However, there are several ways besides extremely rapid cooling to produce amorphous metals, including physical vapor deposition, solid-state reaction, ion irradiation, melt spinning, and mechanical alloying. Amorphous alloys can be a single class of materials, regardless of how they are prepared.

Amorphous metals can be produced through a variety of quick-cooling methods. For instance, amorphous metals can be produced by sputtering molten metal onto a spinning metal disk. The rapid cooling, on the order of millions of degrees a second, can be too fast for crystals to form, and the material is thus "locked in" a glassy state. Also, amorphous metals/alloys can be produced with critical cooling rates low enough to allow formation of amorphous structures in thick layers—e.g., bulk metallic glasses.

The terms "bulk metallic glass" ("BMG"), bulk amorphous alloy ("BAA"), and bulk solidifying amorphous alloy are used interchangeably herein. They refer to amorphous alloys having the smallest dimension at least in the millimeter range. For example, the dimension can be at least about 0.5 mm, such as at least about 1 mm, such as at least about 2 mm, such as at least about 4 mm, such as at least about 5 mm, such as at least about 6 mm, such as at least about 8 mm, such as at least about 10 mm, such as at least about 12 mm. Depending on the geometry, the dimension can refer to the diameter, radius, thickness, width, length, etc. A BMG can also be a metallic glass having at least one dimension in the centimeter range, such as at least about 1.0 cm, such as at least about 2.0 cm, such as at least about 5.0 cm, such as at least about 10.0 cm. In some embodiments, a BMG can have at least one dimension at least in the meter range. A BMG can take any of the shapes or forms described above, as related to a metallic glass. Accordingly, a BMG described herein in some embodiments can be different from a thin film made by a conventional deposition technique in one important aspect—the former can be of a much larger dimension than the latter.

Amorphous metals can be an alloy rather than a pure metal. The alloys may contain atoms of significantly different sizes, leading to low free volume (and therefore having viscosity up to orders of magnitude higher than other metals and alloys) in a molten state. The viscosity prevents the atoms from moving enough to form an ordered lattice. The material structure may result in low shrinkage during cooling and resistance to plastic deformation. The absence of grain boundaries, the weak spots of crystalline materials in some cases, may, for example, lead to better resistance to wear and corrosion. In one embodiment, amorphous metals, while technically glasses, may also be much tougher and less brittle than oxide glasses and ceramics.

Thermal conductivity of amorphous materials may be lower than that of their crystalline counterparts. To achieve formation of an amorphous structure even during slower cooling, the alloy may be made of three or more components, leading to complex crystal units with higher potential energy and lower probability of formation. The formation of amorphous alloy can depend on several factors: the composition of the components of the alloy; the atomic radius of the components (preferably with a significant difference of over 12% to achieve high packing density and low free volume); and the negative heat of mixing the combination of components, inhibiting crystal nucleation and prolonging the time the molten metal stays in a supercooled state. However, as the formation of an amorphous alloy is based on many different variables, it can be difficult to make a prior determination of whether an alloy composition would form an amorphous alloy.

Amorphous alloys, for example, of boron, silicon, phosphorus, and other glass formers with magnetic metals (iron, cobalt, nickel) may be magnetic, with low coercivity and high electrical resistance. The high resistance leads to low losses by eddy currents when subjected to alternating magnetic fields, a property useful, for example, as transformer magnetic cores.

Amorphous alloys may have a variety of potentially useful properties. In particular, they tend to be stronger than crystalline alloys of similar chemical composition, and they can sustain larger reversible ("elastic") deformations than crystalline alloys. Amorphous metals derive their strength directly from their non-crystalline structure, which can have none of the defects (such as dislocations) that limit the strength of crystalline alloys. For example, one modern amorphous metal, known as Vitreloy™, has a tensile strength that is almost twice that of high-grade titanium. In some embodiments, metallic glasses at room temperature are not ductile and tend to fail suddenly when loaded in tension, which limits the material applicability in reliability-critical applications, as the impending failure is not evident. Therefore, to overcome this challenge, metal matrix composite materials having a metallic glass matrix containing dendritic particles or fibers of a ductile crystalline metal can be used. Alternatively, a BMG low in element(s) that tend to cause embitterment (e.g., Ni) can be used. For example, a Ni-free BMG can be used to improve the ductility of the BMG.

Another useful property of bulk amorphous alloys is that they can be true glasses; in other words, they can soften and flow upon heating. This can allow for easy processing, such as by injection molding, in much the same way as polymers. As a result, amorphous alloys can be used for making sports equipment, medical devices, electronic components and equipment, and thin films. Thin films of amorphous metals can be deposited as protective coatings via a high velocity oxygen fuel technique.

A material can have an amorphous phase, a crystalline phase, or both. The amorphous and crystalline phases can have the same chemical composition and differ only in the microstructure—i.e., one amorphous and the other crystalline. Microstructure in one embodiment refers to the structure of a material as revealed by a microscope at 25× magnification or higher. Alternatively, the two phases can have different chemical compositions and microstructures. For example, a composition can be partially amorphous, substantially amorphous, or completely amorphous.

As described above, the degree of amorphicity (and conversely the degree of crystallinity) can be measured by fraction of crystals present in the alloy. The degree can refer to volume fraction of weight fraction of the crystalline phase present in the alloy. A partially amorphous composition can refer to a composition of at least about 5 vol % of which is of an amorphous phase, such as at least about 10 vol %, such as at least about 20 vol %, such as at least about 40 vol %, such as at least about 60 vol %, such as at least about 80 vol %, such as at least about 90 vol %. The terms "substantially" and "about" have been defined elsewhere in this application. Accordingly, a composition that is at least substantially amorphous can refer to one of which at least about 90 vol % is amorphous, such as at least about 95 vol %, such as at least about 98 vol %, such as at least about 99 vol %, such as at least about 99.5 vol %, such as at least about 99.8 vol %, such as at least about 99.9 vol %. In one embodiment, a substantially amorphous composition can have some incidental, insignificant amount of crystalline phase present therein.

In one embodiment, an amorphous alloy composition can be homogeneous with respect to the amorphous phase. A substance that is uniform in composition is homogeneous. This is in contrast to a substance that is heterogeneous. The term "composition" refers to the chemical composition and/or microstructure in the substance. A substance is homogeneous when a volume of the substance is divided in half and both halves have substantially the same composition. For example, a particulate suspension is homogeneous when a volume of the particulate suspension is divided in half and both halves have substantially the same volume of particles. However, it might be possible to see the individual particles under a microscope. Another example of a homogeneous substance is air where different ingredients therein are equally suspended, though the particles, gases and liquids in air can be analyzed separately or separated from air.

A composition that is homogeneous with respect to an amorphous alloy can refer to one having an amorphous phase substantially uniformly distributed throughout its microstructure. In other words, the composition macroscopically comprises a substantially uniformly distributed amorphous alloy throughout the composition. In an alternative embodiment, the composition can be of a composite, having an amorphous phase having therein a non-amorphous phase. The non-amorphous phase can be a crystal or a plurality of crystals. The crystals can be in the form of particulates of any shape, such as spherical, ellipsoid, wire-like, rod-like, sheet-like, flake-like, or an irregular shape. In one embodiment, it can have a dendritic form. For example, an at least partially amorphous composite composition can have a crystalline phase in the shape of dendrites dispersed in an amorphous phase matrix; the dispersion can be uniform or non-uniform, and the amorphous phase and the crystalline phase can have the same or a different chemical composition. In one embodiment, they have substantially the same chemical composition. In another embodiment, the crystalline phase can be more ductile than the BMG phase.

The methods described herein can be applicable to any type of amorphous alloy. Similarly, the amorphous alloy described herein as a constituent of a composition or article can be of any type. The amorphous alloy can comprise the element Zr, Hf, Ti, Cu, Ni, Pt, Pd, Fe, Mg, Au, La, Ag, Al, Mo, Nb, Be, or combinations thereof Namely, the alloy can include any combination of these elements in its chemical formula or chemical composition. The elements can be present at different weight or volume percentages. For example, an iron "based" alloy can refer to an alloy having a non-insignificant weight percentage of iron present therein, the weight percent can be, for example, at least about 20 wt %, such as at least about 40 wt %, such as at least about 50 wt %, such as at least about 60 wt %, such as at least about 80 wt %. Alternatively, in one embodiment, the above-described percentages can be volume percentages, instead of weight percentages. Accordingly, an amorphous alloy can be zirconium-based, titanium-based, platinum-based, palladium-based, gold-based, silver-based, copper-based, iron-based, nickel-based, aluminum-based, molybdenum-based, and the like. The alloy can also be free of any of the aforementioned elements to suit a particular purpose. For example, in some embodiments, the alloy, or the composition including the alloy, can be substantially free of nickel, aluminum, titanium, beryllium, or combinations thereof In one embodiment, the alloy or the composite is completely free of nickel, aluminum, titanium, beryllium, or combinations thereof For example, the amorphous alloy can have the formula $(Zr, Ti)_a(Ni, Cu, Fe)_b(Be, Al, Si, B)_c$, wherein a, b, and c each represents a weight or atomic percentage. In one embodiment, a is in the range of from 30 to 75, b is in the range of from 5 to 60, and c is in the range of from 0 to 50 in atomic percentages. Alternatively, the amorphous alloy can have the formula $(Zr, Ti)_a(Ni, Cu)_b(Be)_c$, wherein a, b, and c each represents a weight or atomic percentage. In one embodiment, a is in the range of from 40 to 75, b is in the range of from 5 to 50, and c is in the range of from 5 to 50 in atomic percentages. The alloy can also have the formula $(Zr, Ti)_a(Ni, Cu)_b(Be)_c$, wherein a, b, and c each represents a weight or atomic percentage. In one embodiment, a is in the range of from 45 to 65, b is in the range of from 7.5 to 35, and c is in the range of from 10 to 37.5 in atomic percentages. Alternatively, the alloy can have the formula $(Zr)_a(Nb, Ti)_b(Ni, Cu)_c(Al)_d$, wherein a, b, c, and d each represents a weight or atomic percentage. In one embodiment, a is in the range of from 45 to 65, b is in the range of from 0 to 10, c is in the range of from 20 to 40 and d is in the range of from 7.5 to 15 in atomic percentages. One exemplary embodiment of the afore-described alloy system is a Zr—Ti—Ni—Cu—Be based amorphous alloy under the trade name Vitreloy™, such as Vitreloy-1 and Vitreloy-101, as fabricated by Liquid metal Technologies, CA, USA. Some examples of amorphous alloys of the different systems are provided in Table 1 and Table 2.

TABLE 1

Exemplary amorphous alloy compositions

| Alloy | Atm % | Atm % | Atm % | Atm % | Atm % | Atm % | Atm % | Atm % |
|---|---|---|---|---|---|---|---|---|
| 1 | Fe | Mo | Ni | Cr | P | C | B | |
| | 68.00% | 5.00% | 5.00% | 2.00% | 12.50% | 5.00% | 2.50% | |
| 2 | Fe | Mo | Ni | Cr | P | C | B | Si |
| | 68.00% | 5.00% | 5.00% | 2.00% | 11.00% | 5.00% | 2.50% | 1.50% |
| 3 | Pd | Cu | Co | P | | | | |
| | 44.48% | 32.35% | 4.05% | 19.11% | | | | |
| 4 | Pd | Ag | Si | P | | | | |
| | 77.50% | 6.00% | 9.00% | 7.50% | | | | |
| 5 | Pd | Ag | Si | P | Ge | | | |
| | 79.00% | 3.50% | 9.50% | 6.00% | 2.00% | | | |
| 5 | Pt | Cu | Ag | P | B | Si | | |
| | 74.70% | 1.50% | 0.30% | 18.0% | 4.00% | 1.50% | | |

TABLE 2

Additional Exemplary amorphous alloy compositions (atomic %)

| Alloy | Atm % | Atm % | Atm % | Atm % | Atm % | Atm % |
|---|---|---|---|---|---|---|
| 1 | Zr 41.20% | Ti 13.80% | Cu 12.50% | Ni 10.00% | Be 22.50% | |
| 2 | Zr 44.00% | Ti 11.00% | Cu 10.00% | Ni 10.00% | Be 25.00% | |
| 3 | Zr 56.25% | Ti 11.25% | Cu 6.88% | Ni 5.63% | Nb 7.50% | Be 12.50% |
| 4 | Zr 64.75% | Ti 5.60% | Cu 14.90% | Ni 11.15% | Al 2.60% | Be 1.00% |
| 5 | Zr 52.50% | Ti 5.00% | Cu 17.90% | Ni 14.60% | Al 10.00% | |
| 6 | Zr 57.00% | Nb 5.00% | Cu 15.40% | Ni 12.60% | Al 10.00% | |
| 7 | Zr 50.75% | Cu 36.23% | Ni 4.03% | Al 9.00% | | |
| 8 | Zr 46.75% | Ti 8.25% | Cu 7.50% | Ni 10.00% | Be 27.50% | |
| 9 | Zr 21.67% | Ti 43.33% | Ni 7.50% | Be 27.50% | | |
| 10 | Zr 35.00% | Ti 30.00% | Cu 7.50% | Be 27.50% | | |
| 11 | Zr 35.00% | Ti 30.00% | Co 6.00% | Be 29.00% | | |
| 12 | Zr 35.00% | Ti 30.00% | Fe 2.00% | Be 33.00% | | |
| 13 | Au 49.00% | Ag 5.50% | Pd 2.30% | Cu 26.90% | Si 16.30% | |
| 14 | Au 50.90% | Ag 3.00% | Pd 2.30% | Cu 27.80% | Si 16.00% | |
| 15 | Pt 57.50% | Cu 14.70% | Ni 5.30% | P 22.50% | | |
| 16 | Zr 36.60% | Ti 31.40% | Nb 7.00% | Cu 5.90% | Be 19.10% | |
| 17 | Zr 38.30% | Ti 32.90% | Nb 7.30% | Cu 6.20% | Be 15.30% | |
| 18 | Zr 39.60% | Ti 33.90% | Nb 7.60% | Cu 6.40% | Be 12.50% | |
| 19 | Cu 47.00% | Ti 34.00% | Zr 11.00% | Ni 8.00% | | |
| 20 | Zr 55.00% | Co 25.00% | Al 20.00% | | | |

Other exemplary ferrous metal-based alloys include compositions such as those disclosed in U.S. Patent Application Publication Nos. 2007/0079907 and 2008/0118387. These compositions include the Fe(Mn, Co, Ni, Cu) (C, Si, B, P, Al) system, wherein the Fe content is from 60 to 75 atomic percentage, the total of (Mn, Co, Ni, Cu) is in the range of from 5 to 25 atomic percentage, and the total of (C, Si, B, P, Al) is in the range of from 8 to 20 atomic percentage, as well as the exemplary composition Fe48Cr15Mo14Y2C15B6. They also include the alloy systems described by Fe—Cr—Mo—(Y,Ln)—C—B, Co—Cr—Mo—Ln—C—B, Fe—Mn—Cr—Mo—(Y,Ln)—C—B, (Fe, Cr, Co)—(Mo, Mn)—(C,B)—Y, Fe—(Co,Ni)—(Zr,Nb,Ta)—(Mo,W)—B, Fe—(Al,Ga)—(P,C,B,Si,Ge), Fe—(Co, Cr,Mo,Ga,Sb)—P—B—C, (Fe, Co)—B—Si—Nb alloys, and Fe—(Cr—Mo)—(C,B)—Tm, where Ln denotes a lanthanide element and Tm denotes a transition metal element. Furthermore, the amorphous alloy can also be one of the exemplary compositions Fe80P12.5C5B2.5, Fe80P11C5B2.5Si1.5, Fe74.5Mo5.5P12.5C5B2.5, Fe74.5Mo5.5P11C5B2.5Si1.5, Fe70Mo5Ni5P12.5C5B2.5, Fe70Mo5Ni5P11C5B2.5Si1.5, Fe68Mo5Ni5Cr2P12.5C5B2.5, and Fe68Mo5Ni5Cr2P11C5B2.5Si1.5, described in U.S. Patent Application Publication No. 2010/0300148.

The amorphous alloys can also be ferrous alloys, such as (Fe, Ni, Co) based alloys. Examples of such compositions are disclosed in U.S. Pat. Nos. 6,325,868; 5,288,344; 5,368,659; 5,618,359; and 5,735,975, Inoue et al., Appl. Phys. Lett., Volume 71, p 464 (1997), Shen et al., Mater. Trans., JIM, Volume 42, p 2136 (2001), and Japanese Patent Application No. 200126277 (Pub. No. 2001303218 A). One exemplary composition is $Fe_{72}Al_5Ga_2P_{11}C_6B_4$. Another example is $Fe_{72}Al_7Zr_{10}Mo_5W_2B_{15}$. Another iron-based alloy system that can be used in the coating herein is disclosed in U.S. Patent Application Publication No. 2010/0084052, wherein the amorphous metal contains, for example, manganese (1 to 3 atomic %), yttrium (0.1 to 10 atomic %), and silicon (0.3 to 3.1 atomic %) in the range of composition given in parentheses; and that contains the following elements in the specified range of composition given in parentheses: chromium (15 to 20 atomic %), molybdenum (2 to 15 atomic %), tungsten (1 to 3 atomic %), boron (5 to 16 atomic %), carbon (3 to 16 atomic %), and the balance iron.

The amorphous alloy can also be one of the Pt- or Pd-based alloys described by U.S. Patent Application Publication Nos. 2008/0135136, 2009/0162629, and 2010/0230012. Exemplary compositions include Pd44.48Cu32.35Co4.05P19.11, Pd77.5Ag6Si9P7.5, and Pt74.7Cu1.5Ag0.3P18B4Si1.5.

The aforedescribed amorphous alloy systems can further include additional elements, such as additional transition metal elements, including Nb, Cr, V, and Co. The additional elements can be present at less than or equal to about 30 wt %, such as less than or equal to about 20 wt %, such as less than or equal to about 10 wt %, such as less than or equal to about 5 wt %. In one embodiment, the additional, optional element is at least one of cobalt, manganese, zirconium, tantalum, niobium, tungsten, yttrium, titanium, vanadium and hafnium to form carbides and further improve wear and corrosion resistance. Further optional elements may include phosphorous, germanium and arsenic, totaling up to about 2%, and preferably less than 1%, to reduce melting point. Otherwise incidental impurities should be less than about 2% and preferably 0.5%.

In some embodiments, a composition having an amorphous alloy can include a small amount of impurities. The impurity elements can be intentionally added to modify the properties of the composition, such as improving the mechanical properties (e.g., hardness, strength, fracture mechanism, etc.) and/or improving the corrosion resistance. Alternatively, the impurities can be present as inevitable, incidental impurities, such as those obtained as a byproduct of processing and manufacturing. The impurities can be less than or equal to about 10 wt %, such as about 5 wt %, such as about 2 wt %, such as about 1 wt %, such as about 0.5 wt %, such as about 0.1 wt %. In some embodiments, these percentages can be volume percentages instead of weight percentages. In one embodiment, the alloy sample/composition consists essentially of the amorphous alloy (with only a small incidental amount of impurities). In another embodiment, the composition includes the amorphous alloy (with no observable trace of impurities).

In one embodiment, the final parts exceeded the critical casting thickness of the bulk solidifying amorphous alloys.

In embodiments herein, the existence of a supercooled liquid region in which the bulk-solidifying amorphous alloy can exist as a high viscous liquid allows for superplastic forming. Large plastic deformations can be obtained. The ability to undergo large plastic deformation in the supercooled liquid region is used for the forming and/or cutting process. As oppose to solids, the liquid bulk solidifying alloy deforms locally which drastically lowers the required energy for cutting and forming. The ease of cutting and forming depends on the temperature of the alloy, the mold, and the cutting tool. As higher is the temperature, the lower is the viscosity, and consequently easier is the cutting and forming.

Embodiments herein can utilize a thermoplastic-forming process with amorphous alloys carried out between Tg and Tx, for example. Herein, Tx and Tg are determined from standard DSC measurements at typical heating rates (e.g. 20° C./min) as the onset of crystallization temperature and the onset of glass transition temperature.

The amorphous alloy components can have the critical casting thickness and the final part can have thickness that is thicker than the critical casting thickness. Moreover, the time and temperature of the heating and shaping operation is selected such that the elastic strain limit of the amorphous alloy could be substantially preserved to be not less than 1.0%, and preferably not being less than 1.5%. In the context of the embodiments herein, temperatures around glass transition means the forming temperatures can be below glass transition, at or around glass transition, and above glass transition temperature, but preferably at temperatures below the crystallization temperature $T_X$. The cooling step is carried out at rates similar to the heating rates at the heating step, and preferably at rates greater than the heating rates at the heating step. The cooling step is also achieved preferably while the forming and shaping loads are still maintained Electronic Devices The embodiments herein can be valuable in the fabrication of electronic devices using a BMG. An electronic device herein can refer to any electronic device known in the art. For example, it can be a telephone, such as a cell phone, and a land-line phone, or any communication device, such as a smart phone, including, for example an iPhone™, and an electronic email sending/receiving device. It can be a part of a display, such as a digital display, a TV monitor, an electronic-book reader, a portable web-browser (e.g., iPad™), and a computer monitor. It can also be an entertainment device, including a portable DVD player, conventional DVD player, Blue-Ray disk player, video game console, music player, such as a portable music player (e.g., iPod™), etc. It can also be a part of a device that provides control, such as controlling the streaming of images, videos, sounds (e.g., Apple TV™), or it can be a remote control for an electronic device. It can be a part of a computer or its accessories, such as the hard drive tower housing or casing, laptop housing, laptop keyboard, laptop track pad, desktop keyboard, mouse, and speaker. The article can also be applied to a device such as a watch or a clock.

Embodiments

An embodiment provided herein includes a method of forming an article by providing a foam material, and insert casting onto the foam material a bulk-solidifying amorphous alloy to form the article. The foam material can be used as an integral part of the article to improve or otherwise alter the properties of the bulk-solidifying amorphous alloy that is insert cast into or on the foam. In addition, the foam material can be used as a processing aid to enable the formation of bulk-solidifying amorphous alloy materials that otherwise could not have been formed using conventional processing techniques (e g , making an article having a thickness greater than the critical casting thickness of the bulk-solidifying amorphous alloy alone).

Another embodiment provides a method of making an article that includes providing a foam material, insert casting onto the foam material a bulk-solidifying amorphous alloy, removing the foam, and optionally inserting another metal or bulk-solidifying amorphous alloy to replace the removed foam. The foam material can be removed from the article by etching, melting, etc., thereby leaving a bulk-solidifying amorphous article with voids where the foam previously existed. These voids can remain in the article, or may be filled with a different material, or filled with the same bulk-solidifying amorphous alloy to provide the final article.

Another embodiment provides an article comprised of a bulk-solidifying amorphous alloy and a foam. In one embodiment, the article includes of a laminate of bulk-solidifying amorphous alloy and a foam. In another embodiment, the article includes a bulk-solidifying amorphous alloy having a thickness greater than the critical casting thickness, optionally including a foam, or having dispersed therein a metal or a bulk-solidifying amorphous alloy Any foam material can be used in the embodiments so long as it is capable of withstanding the insert casting processing conditions by which the bulk-solidifying amorphous metal is cast into and on the open cell metal foam. Suitable foam materials include hard polymeric foams, metal foams, ductile metal foams, ceramic foams, and the like. In one embodiment, the foam is an open cell metal foam, which is intended to denote a metal foam having intersticies or voids that extend throughout the material, and provide at least one channel from one surface of the foam to the opposing surface.

Figure 3:
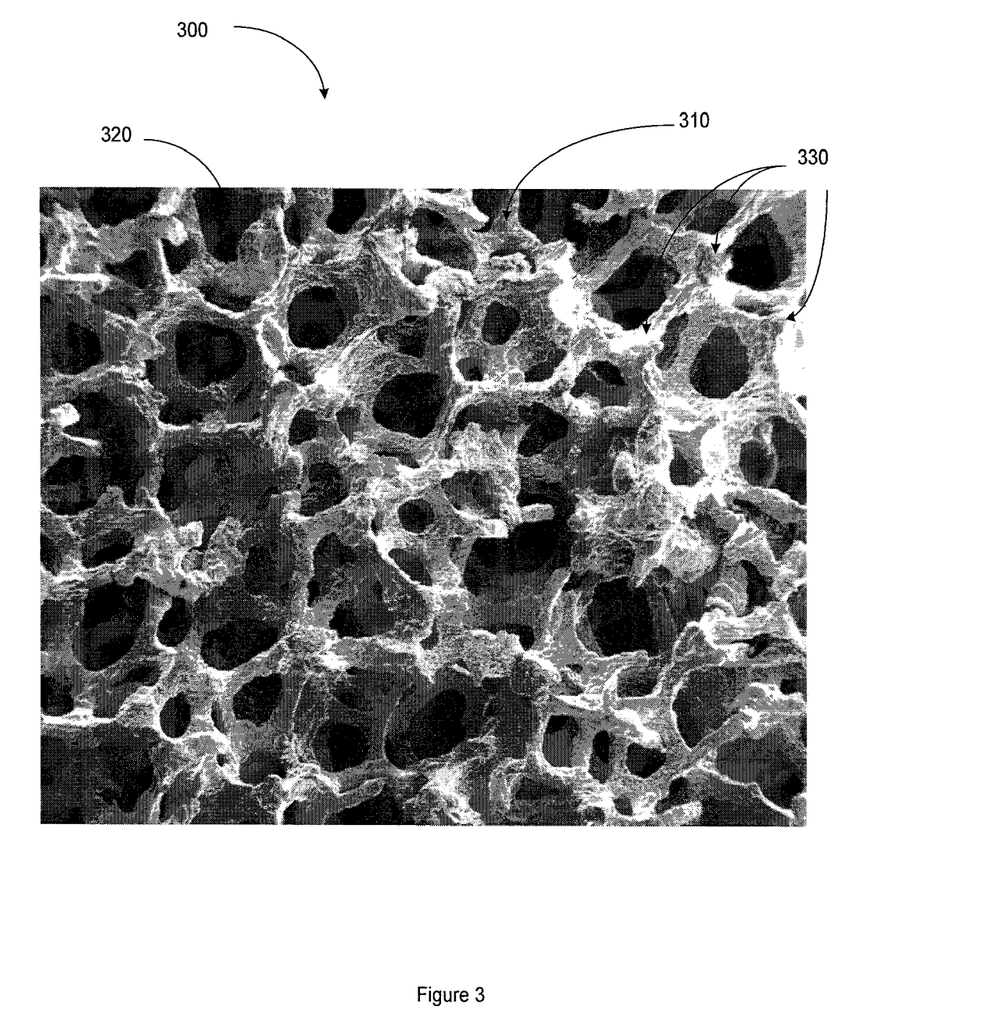
FIG. 3 is an electron scanning micrograph of an open cell metal foam.

An exemplary open cell metal foam is shown in FIG. 3, a scanning electron micrograph of a metal foam, magnified 10 times. As shown, the metal foam 300 includes a metal lattice structure 310 that includes a plurality of voids 320 that extend throughout the foam material. These voids 320 can be filled with a bulk-solidifying amorphous alloy material and the surface coated with the bulk-solidifying amorphous alloy material to provide a final article that has dimensions greater than the critical casting dimensions of the bulk-solidifying amorphous alloy material. In addition, the specific metal and porosity of the metal foam can be selected to provide certain properties (e.g., ductility, thermal and/or electrical conductivity, etc.) to the final article that are not otherwise available using bulk-solidifying amorphous alloy materials. For example, it is known that bulk-solidifying amorphous alloy materials can be brittle due to their hardness, but use of a more ductile open cell metal foam may provide a final article that still benefits from the hardness of the bulk-solidifying amorphous alloy, but is not as brittle as the bulk-solidifying amorphous alloy material itself. The presence of the metal foam therefore may create a composite material with the bulk-solidifying amorphous alloy material.

Suitable metal foams may be made by any conventional techniques known in the art. The embodiments may make use of the metal foams disclosed in, for example, U.S. Pat. Nos. 5,588,477, 5,679,041, 5,738,907, 5,951,791, 6,678,182, and 7,328,831, the disclosures of which are incorporated by reference herein in their entireties. In one embodiment, the metal foam substrate is not removed, but rather remains during bulk-solidifying amorphous alloy filling and becomes an integral part of the finished product. More specifically, a metal foam substrate is used which comprises a plurality of randomly oriented ligaments 310 interconnected by a plurality of nodes 330 that together form a three-dimensional reticulum defining a multitude of interstitial voids 320 the comprise cells. The metal foam substrate may comprise the same, essentially the same (i.e., alloys of), or an entirely different metal than the bulk-solidifying amorphous alloy material, depending on the needs of the final product being produced. Hence, for example, the open cell metal foam may comprise aluminum, magnesium, nickel, iron, copper, etc.

One metal foam, useful in the embodiments, may be formed by electrodepositing a layer of metal onto a fugitive foam substrate (i.e., polyurethane) such as described in U.S. Pat. No. 3,694,325, the disclosure of which is incorporated by reference herein in its entirety. The fugitive foam is then burned-off leaving a hollow metal network. Another metal foam useful with the embodiments may be formed by depositing metal particles onto a fugitive substrate, and then sintering the particles together while concurrently removing the substrate. Still other foams made by directional solidification may be used. One such directionally solidified aluminum foam, for example, is sold under the trade name DUOCEL® by the ERG Materials and Aerospace Corporation has been used effectively.

In accordance with an embodiment, the open-cell, metallic foam may be impregnated with a slurry of filler particles suspended in a fugitive vehicle, in which the filler particles serve to modify the mechanical properties of the metal foam and resulting final article. The vehicle used to carry the particles into the metal foam substrate may comprise any of a variety of fluids including organics such as wax, polystyrene, polyethylene, methyl cellulose/$H_2O$ gel, etc., or simply water, for filling the polymeric foam. While an aqueous sedimentation process may be used with metal foam, preferably the particles will be thoroughly mixed with an organic binder and injected under pressure into a mold containing the substrate. One such binder comprises eighty (80) weight percent diphenyl carbonate and twenty (20) weight percent polystyrene. After pre-blending at 120° C., the binder is mixed with the desired fiber or particulate volume fraction by using a roller blade mixer, a sigma blade mixer or twin-screw extruder. The feedstock then can be extruded and pelletized for introduction into an injection molding machine. The metallic foam can be inserted into a die of the same or other shape, and the feedstock melted by the action of the molding screw and injected into the die under pressure, infiltrating the interconnected pores of the foam from the gate to the end-of-fill The foam aids in the reduction of shrink-related voids by serving as already-dense filler. The use of injection molding to infiltrate reinforcement is not limited to metal networks, but may also be used with relatively rigid polymer foams as well.

If a filler were optionally used as described above, following impregnation of the metal foam substrate with the slurry, the vehicle would be removed so as to leave the filler particles entrained within the interstitial cells/pores of the metal foam substrate. In the case of organic/polymeric vehicles, removal is preferably effected by heating the particle-filled foam sufficiently to volatize or burn-off the vehicle. With the metal foam substrate present, this burn-off can be achieved more quickly than if there were no such substrate present and without fear of distorting the foam material. Alternatively, the organic vehicle may be removed by dissolution in an appropriate solvent, or by etching. A combination of solvent and heat removal has been demonstrated for vehicles comprising a mixture of two or more organic ingredients. If a polymeric binder were used, e.g., diphenyl carbonate, this binder may be removed by dissolution in warm methanol and the remaining polymer removed by thermal treatment to 600° C. For aluminum foams, which are low-melting and easily-oxidized, the heat-treatment can be done in a non-oxidizing atmosphere (Ar, $N_2$) to 450° C. Aqueous vehicles are most simply removed by heating to drive off the water and dry the particle-filled metal foam. Metal foam substrates having cell/pore sizes between about 500 microns and 2000 microns permit particle loadings up to about 15% by volume to about 70% by volume respectively with a maximum of about 45% by volume when the particles are fibrils having aspect ratios greater than about 10.

In certain embodiments, the metal in the foam tends to melt, at least on its surface, and weld with the bulk-solidifying amorphous alloy being insert cast into and onto the foam. In other embodiments, some alloying/diffusion bonding may occur at the interfaces between the metal foam and the bulk-solidifying amorphous alloy. Preheating of the metal foam to about 200° to 800° C.. may facilitate impregnation of the bulk-solidifying amorphous alloy material.

Insert casting may be carried out to form the final article. In one embodiment, insert casting may be carried out by pouring molten or semi-molten bulk-solidifying amorphous alloy into the at least one cavity 320, and then cooling the product to form a metal-to-metal bond between the metal foam and the bulk-solidifying amorphous alloy material. The metal-to-metal bond also may be formed by alloying/diffusion bonding, and/or by melting a portion of the metal foam material 300 which in turn welds with the bulk-solidifying amorphous alloy material. Alternatively, the at least one surface of the cavity 320 may be treated with a material that facilitates a metal-to-metal bond, such as a thin foil that will deform, melt, or otherwise fuse to the bulk-solidifying amorphous alloy during the insert casting procedure. In another embodiment, the at metal foam material 300 may be treated to facilitate the metal-to-metal bond, for example, by a blasting treatment with a nonmetallic abrasive, or using a surface roughening treatment such as contact with an acid.

In another embodiment, after the metal foam material 300 has been filled with bulk-solidifying amorphous alloy material, another thin sheet of bulk-solidifying amorphous alloy could be deposited in one or more surfaces of the filled metal foam. The laminate structure then can be heated and thermally plastically formed so that the final article provides a smooth surface of bulk-solidifying amorphous alloy with a metal foam material positioned underneath. The metal foam in this embodiment could be etched away and replaced with another material, including the same bulk-solidifying amorphous alloy or another bulk-solidifying amorphous alloy material having different properties. Alternatively, the metal foam could be etched away leaving a porous bulk-solidifying amorphous alloy material that is then laminated with one or more thin sheets of bulk-solidifying amorphous alloy.

Figure 4:
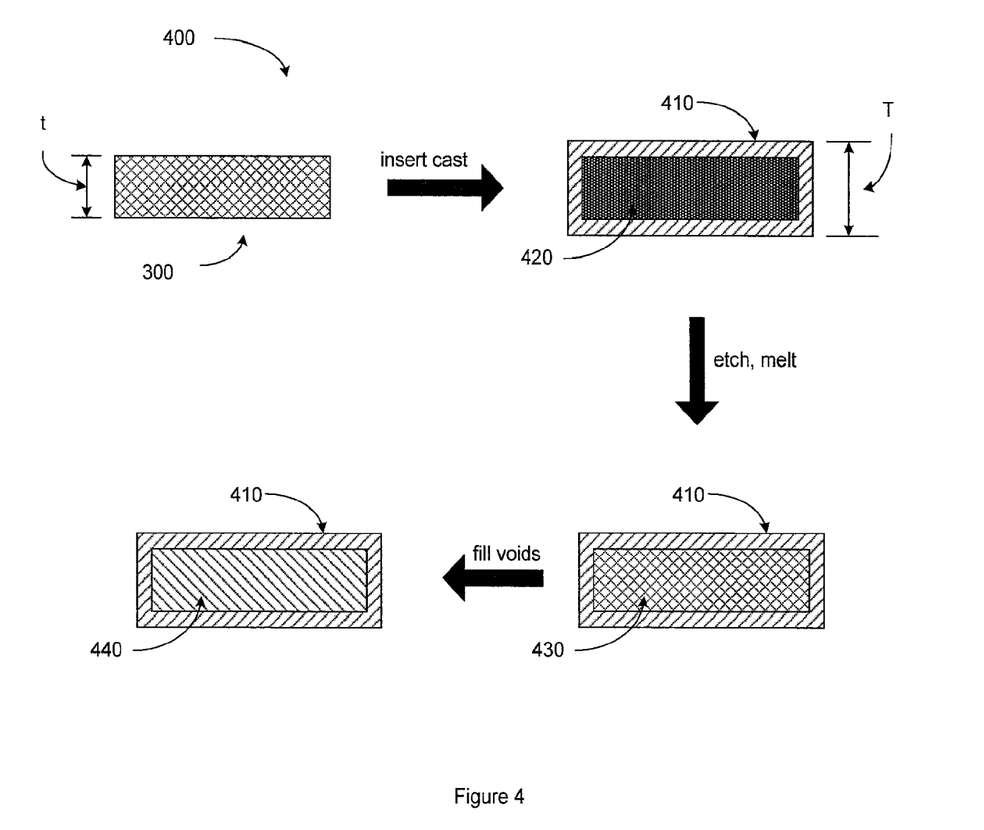
FIG. 4 provides a schematic of a method of making an article in accordance with an embodiment.

One exemplary method of insert casting a bulk-solidifying amorphous alloy material into and onto a foam material is shown in FIG. 4. The method is particularly suitable for use in fabricating articles having a thickness greater than the critical casting thickness of the bulk-solidifying amorphous alloy material. For example, if the critical casting thickness of a particular bulk-solidifying amorphous alloy material is 3 mm, but the final product must be 6 mm or more, simply fabricating a bulk-solidifying amorphous alloy material might not be possible given this required thickness. In this embodiment, a foam material 300, for example a metal open cell foam material may be provided, having a thickness t. Thickness t may be on the order of 3-5 mm, for example. The bulk-solidifying amorphous alloy material can be insert cast into and on the surface of the foam material 300 to provide an article with a larger thickness T, for example, 6-8 mm in thickness. The bulk solidifying amorphous alloy material may form a skin 410 around the foam 300, and may infiltrate the foam to fill some or all of the voids to provide a filled foam 420.

It is preferred in the embodiments that the foam material 300 be compatible with the insert casting processes so that it can form an integral structure with the bulk-solidifying amorphous alloy material. The foam 300 should be capable of absorbing some of the heat of the bulk-solidifying amorphous alloy material as it is cast into and on the foam 300. Typical casting temperatures may be on the order of 900° C.., whereas the temperature of the foam may only be on the order of 200° C. In some embodiments, the foam may be connected to a heat source to pre-heat the foam, or may be connected to a heat sink the withdraws heat. For example, there may be embodiments in which the entire center of the article is intended to be either completely hollow, or filled with another material (e.g., a material having high thermal conductivity, such as copper). In this embodiment, it may be useful to cool the center portion of the foam so that no bulk-solidifying amorphous alloy infiltrates that far into the foam. Thus, the metal foam will exist by itself in the center and can be melted or etched away to leave a hollow portion. Those skilled in the art will appreciate that the foam may be selectively heated and cooled to provide the desired internal geometry of the final article.

In other embodiments, the foam 300 may be designed to have certain features the extend from the surface of the final article, such as external pins or threads. The bulk-solidifying amorphous alloy then can form a thin skin on the surface of the foam 300, leaving the external pins or threads un-coated. In other embodiments, the foam may be a ceramic foam or other foam material capable of withstanding the insert casting conditions, in which portions of the foam are intended to be flush with the surface of the bulk-solidifying amorphous alloy. This could be accomplished by using a foam having a tooth-like structure where the bulk-solidifying amorphous alloy fills in the foam and forms a skin on the surface in the areas that do not include the protruding teeth. This embodiment might be particularly useful in designing an antenna for use in an electronic device. In yet another embodiment, the insert casting process may result in a material that does not form an external skin on the surface of the foam 300. This material may be useful as a composite material, or could be laminated with one or more sheets of bulk-solidifying amorphous alloy to form a laminate structure similar to that shown on the top right of FIG. 4.

An optional embodiment is shown in FIG. 4 where the insert cast foam/bulk-solidifying amorphous alloy material is further processed to remove the foam structure. This can be accomplished by etching away the material that makes up the ligaments 310 and nodes 330 (FIG. 3) or by melting the material and removing it from the article. If the bulk-solidifying amorphous alloy material filled most of the voids 320 in the foam 300, this optional process will result in a matrix of bulk-solidifying alloy 430 within or underneath a bulk-solidifying amorphous alloy skin 410. As stated above, controlling the cooling characteristics of the foam during insert casting can affect the degree to which the bulk-solidifying amorphous alloy material infiltrates the voids 320 in the foam 300. In addition, the size of the voids 320 also can modify the degree to which the bulk-solidifying amorphous alloy material infiltrates the voids 320 in the foam 300. If the bulk-solidifying amorphous alloy material does not infiltrate the voids 320 all the way to the center of the foam material 300, then this optional removal process will result in a substantially hollow center. The material then may be used as is, or further processed as described below.

Another optional process is to fill the voids left after the removal process, either partially or fully. Any material can be used to fill the voids in the matrix 430, depending on the final product characteristics. For example, if the final product is to have improved conductivity, the voids in matrix 430 may be filled with a conductive material such as copper to provide a filled, or partially filled matrix 440. Other materials can be used to improve the thermal conductivity, or resistivity of the product. Alternatively, the voids in matrix material 430 may be filled with the same or different bulk-solidifying amorphous alloy to provide a final product having a thickness greater than the critical casting thickness of the bulk-solidifying amorphous alloy.

The methods described herein are useful in providing final articles having a variety of desired shapes and physical characteristics. For example, a metal band surrounding a handheld electronic device can be fabricated from a bulk-solidifying amorphous alloy material to provide a hard metal band, but various types of foam materials can be used in various portions of the band to provide desirable characteristics to the band. For example, in areas where increased strength is desired, (e.g., in the corners or other areas typically encountering wear and tear), a foam having smaller voids 320 and thicker ligaments 310, or struts, can be used. In areas where a more ductile material is need, for example surrounding input ports, or metal pin ports, a more ductile foam could be used. These foam materials may be placed in the appropriate positions in the mold, a bulk-solidifying amorphous alloy material then insert cast into the mold to produce the final desired shape of the band, and then select areas of the band could be further processed by etching and then optionally filling to provide greater thermal conductivity or electrical conductivity in certain areas.

Figure 5:
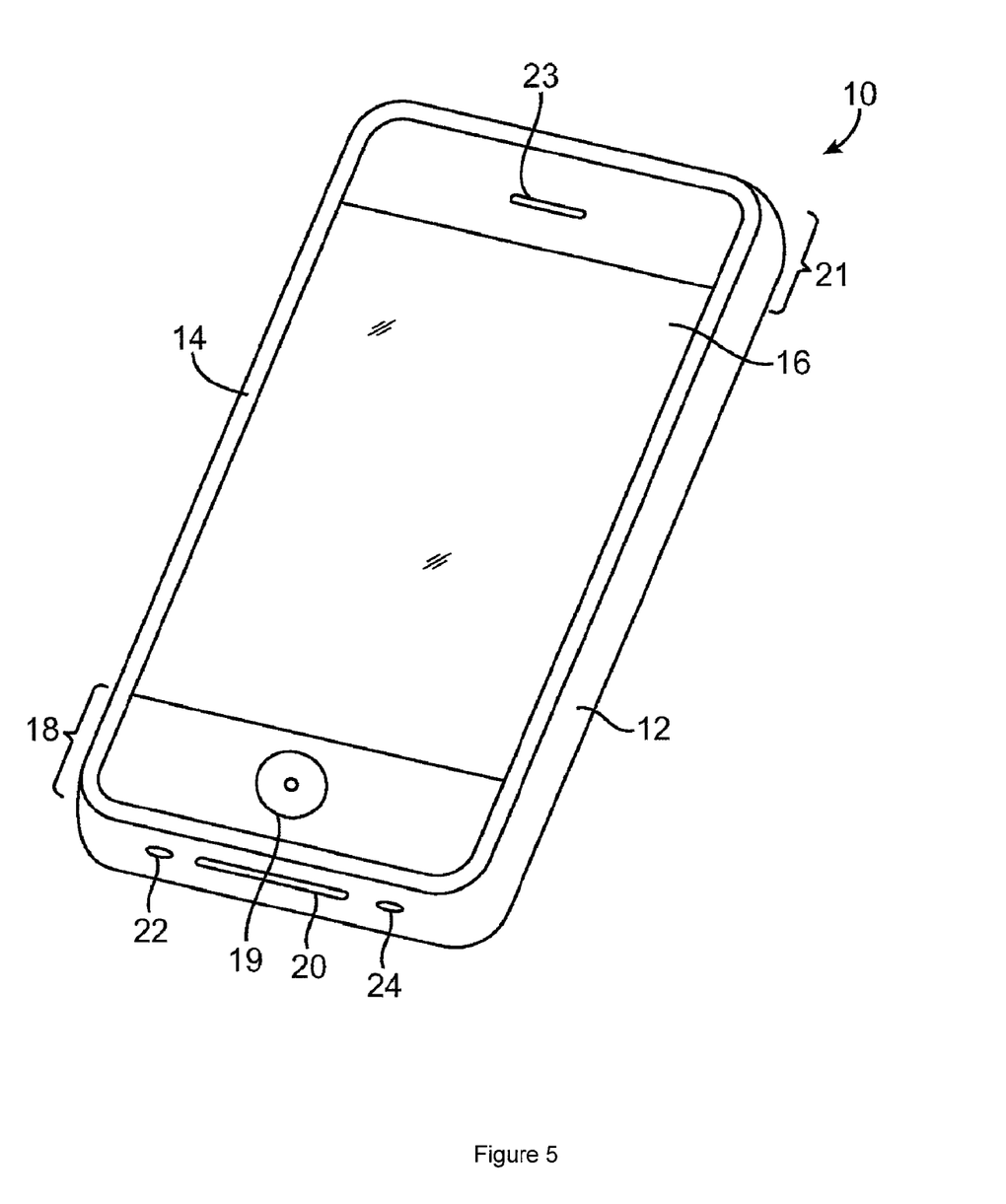
FIG. 5 is perspective view of an illustrative portable electronic device having a housing made with an article in accordance with an embodiment.

An illustrative portable electronic device in accordance with an embodiment of the present invention is shown in FIG. 5. Device 10 of FIG. 5 may be, for example, a handheld electronic device that supports 2G, 3G, and/or 4G cellular telephone and data functions, global positioning system capabilities, and local wireless communications capabilities (e.g., IEEE 802.11 and Bluetooth®) and that supports handheld computing device functions such as internet browsing, email and calendar functions, games, music player functionality, etc. Device 10 may have housing 12, or band. Antennas for handling wireless communications may be housed within housing 12 (as an example), and can be provided by the process described above.

Housing 12, which is sometimes referred to as a case or band, can be fabricated from a composite bulk-solidifying amorphous alloy/foam material made in accordance with the embodiments described herein. In a preferred embodiment, one or more portions of the housing may be processed to form a part of the antennas in device 10. For example, metal portions of housing 12 may be shorted to an internal ground plane in device 10 to create a larger ground plane element for that device 10.

Housing 12 may have a bezel 14. The bezel 14 may be formed from a conductive material or other suitable material. Bezel 14 may serve to hold a display or other device with a planar surface in place on device 10 and/or may serve to form an esthetically pleasing trim around the edge of device 10. As shown in FIG. 5, for example, bezel 14 may be used to surround the top of display 16. Bezel 14 and/or other metal elements associated with device 10 may be used as part of the antennas in device 10. For example, bezel 14 may be shorted to printed circuit board conductors or other internal ground plane structures in device 10 to create a larger ground plane element for device 10.

Display 16 may be a liquid crystal display (LCD), an organic light emitting diode (OLED) display, or any other suitable display. The outermost surface of display 16 may be formed from one or more plastic or glass layers. If desired, touch screen functionality may be integrated into display 16 or may be provided using a separate touch pad device. An advantage of integrating a touch screen into display 16 to make display 16 touch sensitive is that this type of arrangement can save space and reduce visual clutter.

Display screen 16 (e.g., a touch screen) is merely one example of an input-output device that may be used with electronic device 10. If desired, electronic device 10 may have other input-output devices. For example, electronic device 10 may have user input control devices such as button 19, and input-output components such as port 20 and one or more input-output jacks (e.g., for audio and/or video). Button 19 may be, for example, a menu button. Port 20 may contain a 30-pin data connector (as an example). Openings 22 and 24 may, if desired, form speaker and microphone ports. Speaker port 22 may be used when operating device 10 in speakerphone mode. Opening 23 may also form a speaker port. For example, speaker port 23 may serve as a telephone receiver that is placed adjacent to a user's ear during operation. In the example of FIG. 5, display screen 16 is shown as being mounted on the front face of handheld electronic device 10, but display screen 16 may, if desired, be mounted on the rear face of handheld electronic device 10, on a side of device 10, on a flip-up portion of device 10 that is attached to a main body portion of device 10 by a hinge (for example), or using any other suitable mounting arrangement.

A user of electronic device 10 may supply input commands using user input interface devices such as button 19 and touch screen 16. Suitable user input interface devices for electronic device 10 include buttons (e.g., alphanumeric keys, power on-off, power-on, power-off, and other specialized buttons, etc.), a touch pad, pointing stick, or other cursor control device, a microphone for supplying voice commands, or any other suitable interface for controlling device 10. Although shown schematically as being formed on the top face of electronic device 10 in the example of FIG. 5, buttons such as button 19 and other user input interface devices may generally be formed on any suitable portion of electronic device 10. For example, a button such as button 19 or other user interface control may be formed on the side of electronic device 10. Buttons and other user interface controls can also be located on the top face, rear face, or other portion of device 10. If desired, device 10 can be controlled remotely (e.g., using an infrared remote control, a radio-frequency remote control such as a Bluetooth® remote control, etc.).

Electronic device 10 may have ports such as port 20. Port 20, which may sometimes be referred to as a dock connector, 30-pin data port connector, input-output port, or bus connector, may be used as an input-output port (e.g., when connecting device 10 to a mating dock connected to a computer or other electronic device). Port 20 may contain pins for receiving data and power signals. Device 10 may also have audio and video jacks that allow device 10 to interface with external components. Typical ports include power jacks to recharge a battery within device 10 or to operate device 10 from a direct current (DC) power supply, data ports to exchange data with external components such as a personal computer or peripheral, audio-visual jacks to drive headphones, a monitor, or other external audio-video equipment, a subscriber identity module (SIM) card port to authorize cellular telephone service, a memory card slot, etc. The functions of some or all of these devices and the internal circuitry of electronic device 10 can be controlled using input interface devices such as touch screen display 16.

Components such as display 16 and other user input interface devices may cover most of the available surface area on the front face of device 10 (as shown in the example of FIG. 5) or may occupy only a small portion of the front face of device 10. Because electronic components such as display 16 often contain large amounts of metal (e.g., as radio-frequency shielding), the location of these components relative to the antenna elements in device 10 should generally be taken into consideration. Suitably chosen locations for the antenna elements and electronic components of the device will allow the antennas of electronic device 10 to function properly without being disrupted by the electronic components.

Examples of locations in which antenna structures may be located in device 10 include region 18 and region 21. These are merely illustrative examples. Any suitable portion of device 10 may be used to house antenna structures for device 10 if desired. In this embodiment, the bulk-solidifying amorphous alloy/foam composite material may be further processed in these areas by etching and then filling partially or wholly the voids (or hollow portions) remaining after etching with metals suitable for use in an antennae.

The area of housing or band 12 surrounding ports 20, 22, and 24, for example, may be designed to have a greater ductility or flexibility than other areas of housing 12. Use of a brittle bulk-solidifying amorphous alloy material in these areas may result in some of the material being broken, as connector pins, antenna jacks and other input devices are repeatedly inserted and withdrawn from the respective ports 20, 22, and 24. In these areas, a more ductile metal foam may be used having a larger pore size, for example, than foam used in other portions of the housing 12.

The pore size and strut size of the foam 300 also can be modified to provide structural support to the housing 12, for example, in and around the corners. The pore size also can be modified in certain areas to be very small to avoid catastrophic failure in the event pot cracks form on the surface of housing 12. Use of a bulk-solidifying amorphous alloy/foam composite material in which the foam has small pore sizes can help reduce the formation of severe cracks and breaks in the surface of housing 12, in the event a pot crack forms on the surface thereof.

The methods of the embodiments described herein are useful in providing bulk-solidifying amorphous alloy/foam composite materials having specifically tailored characteristics. Bulk-solidifying amorphous alloy/foam composite materials can be designed to have superior strength in one portion by use of a foam having thicker struts, and at the same time have improved flexibility and less brittleness in other portions by use of a more ductile foam. Other areas of the bulk-solidifying amorphous alloy/foam composite materials may be hollow or treated to remove the foam and then subsequently filled with more bulk-solidifying amorphous alloy, with a thermally conductive material, with an electronically conductive material, and the like. Those skilled in the art will appreciate that insert casting a bulk-solidifying amorphous alloy into a foam material, preferably a metal open cell foam, can provide a final bulk-solidifying amorphous alloy/foam composite material having many different properties, most if not all of which could not be achieved through use of the bulk-solidifying amorphous alloy material alone.

One of the embodiments described herein provides for an optional etching process in which the material used to make the foam is etched away after insert casting with a bulk-solidifying amorphous alloy. Suitable etchable materials that may be used to fabricate the foam include those that are "wet" etchable and those that are "dry" etchable. Dry-etchable materials are those that can be etched with a particular gas, such as a chlorine based gas, or a fluorine based gas. Suitable materials for dry etching include, for example, chromium, chromium nitride, chromium oxide, chromium oxynitride, and chromium oxycarbonitride, tantalum nitride, tantalum oxide, and mixtures thereof. Other suitable etchable materials that may be wet-etched include, for example, metal oxides and nitrides of Zr, Hf, La, Si, Y, Indium, and Al, photoresist resins, brass, gold, copper, beryllium-copper, molybdenum, nickel, nickel silver, phosphorous-Bronze, platinum, silicon, Carbon Steel, stainless steel, spring steel, titanium, titanium nitride, tungsten, zinc, Monel, and alloys and mixtures thereof. Any suitable etching material may be used, depending on whether the etchable material 330 is a dry-etchable material or a wet-etchable material. Suitable wet-etching materials include acids such as hydrofluoric acid, sulfuric acid, or other etchants such as sodium hydroxide, ethylene diamine pyrocatechol (EDP), potassium hydroxid/isopropyle alcohol (KOH/IPA), tetramethylammonium hydroxide (TMAH), and the like. Dry-etchants and dry-etching processes, or those used in plasma etching, may include gases containing chlorine or fluorine, such as, for example, carbon tetrachloride, oxygen (for etching ash photoresist), ion milling or sputter etching using noble gases such as argon, reactive-ion etching, and deep reactive-ion etching. The following table provides suitable etchants (wet and dry) that can be used to etch various etchable materials.

| Etchants for Specified material | | |
|---|---|---|
| Material to be etched | Wet etchants | Plasma etchants |
| Aluminium (Al) | 80% phosphoric acid ($H_3PO_4$) + 5% acetic acid + 5% nitric acid ($HNO_3$) + 10% water ($H_2O$) at 35-45° C.; or sodium hydroxide | $Cl_2$, $CCl_4$, $SiCl_4$, $BCl_3$ |
| Indium tin oxide [ITO] ($In_2O_3$:$SnO_2$) | Hydrochloric acid (HCl) + nitric acid ($HNO_3$) + water ($H_2O$) (1:0.1:1) at 40° C. | |
| Chromium (Cr) | Chrome etch: eerie ammonium nitrate (($NH_4$)$_2$Ce($NO_3$)$_6$) + nitric acid ($HNO_3$) Hydrochloric acid (HCl) | |
| Copper | Cupric oxide, ferric chloride, ammonium persulfate, ammonia, 25-50% nitric acid, hydrochloric acid, and hydrogen peroxide | |
| Gold (Au) | Aqua regia | |
| Molybdenum (Mo) | | $CF_4$ |
| Organic residues and photoresist | Piranha etch: sulfuric acid ($H_2SO_4$) + hydrogen peroxide ($H_2O_2$) | $O_2$ (ashing) |
| Platinum (Pt) | Aqua regia | |
| Silicon (Si) | Nitric acid ($HNO_3$) + hydrofluoric acid (HF) | $CF_4$, $SF_6$, $NF_3$ $Cl_2$, $CCl_2F_2$ |
| Silicon dioxide ($SiO_2$) | Hydrofluoric acid (HF) Buffered oxide etch [BOE]: ammonium fluoride ($NH_4F$) and hydrofluoric acid (HF) | $CF_4$, $SF_6$, $NF_3$ |
| Silicon nitride ($Si_3N_4$) | 85% Phosphoric acid ($H_3PO_4$) at 180° C. (Requires $SiO_2$ etch mask) | $CF_4$, $SF_6$, $NF_3$ |
| Tantalum (Ta) | | $CF_4$ |
| Titanium (Ti) | Hydrofluoric acid (HF) | $BCl_3$ |
| Titanium nitride (TiN) | Nitric acid ($HNO_3$) + hydrofluoric acid (HF) SCl Buffered HF (bHF) | |
| Tungsten (W) | Nitric acid ($HNO_3$) + hydrofluoric acid (HF) Hydrogen Peroxide ($H_2O_2$) | $CF_4$ $SF_6$ |

Etchable materials 330 and the etchants that can be used to selectively remove them are described, for example, in Wolf, S.; R. N. Tauber (1986), *Silicon Processing for the VLSI Era: Volume 1—Process Technology.* Lattice Press. pp. 531-534, 546; Walker, Perrin; William H. Tarn (1991), *CRC Handbook of Metal Etchants.* pp. 287-291; and Kohler, Michael (1999). *Etching in Microsystem Technology.* John Wiley & Son Ltd. p. 329. Those having ordinary skill in the art will be capable of utilizing a suitable etchable material to fabricate the foam 300 depending on the desired thickness, the geometry, and the make-up of the final article, using the guidelines provided herein.

While the invention has been described in detail with reference to particularly preferred embodiments, those skilled in the art will appreciate that various modifications may be made thereto without significantly departing from the spirit and scope of the invention.

What is claimed:

1. A method of making an article comprising:
   providing a foam material; and
   insert casting into and/or onto the foam material a bulk-solidifying amorphous alloy to form the article.

2. The method of claim 1, wherein the foam material is an open cell metal foam.

3. The method of claim 1, wherein the thickness of the article is greater than the critical casting thickness of the bulk-solidifying amorphous alloy.

4. The method of claim 1, wherein providing the foam material comprises providing more than one foam material, wherein at least one foam material has a different pore structure than a second foam material.

5. The method of claim 4, wherein the different foam materials are provided in separate areas of the article to provide an article having differing physical properties in the areas where different foam materials are present.

6. The method of claim 1, further comprising impregnating the foam with filler particles prior to insert casting.

7. The method as claimed in claim 1, wherein the bulk-solidifying amorphous alloy is described by the following molecular formula: $(Zr, Ti)_a(Ni, Cu, Fe)_b(Be, Al, Si, B)_c$, wherein "a" is in the range of from 30 to 75, "b" is in the range of from 5 to 60, and "c" is in the range of from 0 to 50 in atomic percentages.

8. The method as claimed in claim 1, wherein the bulk-solidifying amorphous alloy is described by the following molecular formula: $(Zr, Ti)_a(Ni, Cu)_b(Be)_c$, wherein "a" is in the range of from 40 to 75, "b" is in the range of from 5 to 50, and "c" is in the range of from 5 to 50 in atomic percentages.

9. The method as claimed in claim 1, wherein the bulk solidifying amorphous alloy can sustain strains up to 1.5% or more without any permanent deformation or breakage.

10. A method of making an article comprising:
    providing a foam material;

insert casting into and/or onto the foam material a bulk-solidifying amorphous alloy;

removing at least a portion of the foam material; and optionally, inserting another material to at least partially fill the portion of the foam material removed to form the article.

11. The method of claim 10, wherein the foam material is an open cell metal foam.

12. The method of claim 10, wherein at least a portion of the foam is removed by etching.

13. The method of claim 10, wherein inserting another material comprises inserting an electronically conductive material.

14. The method of claim 13, wherein the electronically conductive material is copper.

15. The method as claimed in claim 10, wherein the bulk-solidifying amorphous alloy is described by the following molecular formula: $(Zr, Ti)_a(Ni, Cu, Fe)_b(Be, Al, Si, B)_c$, wherein "a" is in the range of from 30 to 75, "b" is in the range of from 5 to 60, and "c" is in the range of from 0 to 50 in atomic percentages.

16. The method as claimed in claim 10, wherein the bulk-solidifying amorphous alloy is described by the following molecular formula: $(Zr, Ti)_a(Ni, Cu)_b(Be)_c$, wherein "a" is in the range of from 40 to 75, "b" is in the range of from 5 to 50, and "c" is in the range of from 5 to 50 in atomic percentages.

17. The method as claimed in claim 10, wherein the bulk solidifying amorphous alloy can sustain strains up to 1.5% or more without any permanent deformation or breakage.

* * * * *